United States Patent [19]
Macriss et al.

[11] 3,844,737
[45] Oct. 29, 1974

[54] DESICCANT SYSTEM FOR AN OPEN CYCLE AIR-CONDITIONING SYSTEM

[75] Inventors: Robert A. Macriss, Deerfield; William F. Rush, Arlington Heights; Sanford A. Weil, Chicago, all of Ill.

[73] Assignee: Gas Developments Corporation, Chicago, Ill.

[22] Filed: Dec. 12, 1972

[21] Appl. No.: 314,400

Related U.S. Application Data

[63] Continuation-in-part of Ser. No. 24,373, March 31, 1970, abandoned.

[52] U.S. Cl............................ 55/34, 55/75, 55/78, 55/389, 55/390, 62/271
[51] Int. Cl............................................ B01d 53/08
[58] Field of Search........... 55/75, 77, 78, 389, 390, 55/33, 34; 62/271

[56] References Cited
UNITED STATES PATENTS

| | | | |
|---|---|---|---|
| 2,328,974 | 9/1943 | Guler................................... | 55/34 X |
| 2,792,071 | 5/1957 | Pennington....................... | 55/390 X |
| 2,926,502 | 3/1960 | Munters et al.................... | 55/179 X |
| 3,024,867 | 3/1962 | Milton................................ | 55/389 X |
| 3,024,868 | 3/1962 | Milton................................ | 55/389 X |
| 3,078,634 | 2/1963 | Milton................................ | 55/33 |
| 3,091,550 | 5/1963 | Doying.............................. | 55/389 X |
| 3,144,901 | 8/1964 | Meek................................ | 62/271 X |
| 3,164,453 | 1/1965 | Milton................................ | 55/35 |
| 3,266,973 | 8/1966 | Crowley............................ | 55/75 X |
| 3,398,510 | 8/1968 | Pennington....................... | 55/390 X |
| 3,446,031 | 5/1969 | Chang Wchi et al............. | 55/269 X |
| 3,470,708 | 10/1969 | Weil et al......................... | 55/78 X |
| R21,004 | 2/1939 | Kopp................................. | 55/390 X |

OTHER PUBLICATIONS

Perry's Chemical Engineering Handbook, 4th Edition, p. 15-5, 1963.

*Primary Examiner*—Frank W. Lutter
*Assistant Examiner*—Vincent Gifford
*Attorney, Agent, or Firm*—Alexander and Speckman

[57] ABSTRACT

A desiccant system, particularly adapted for a method of operation of an open-cycle air-conditioning system, comprising the use of thin sheets or layers of fibrous materials, such as a "paper" of cellulose, asbestos, fiberglass, polyesters, Teflon, Kel-F, or nylon, which have been impregnated, during their manufacture, with varying amounts of finely powdered, solid, natural or synthetic, crystalline, alkali metal or alkaline earth metal alumino-silicates, such as zeolites or "molecular sieve" materials. The impregnated papers are then formed into moisture transfer bodies, such as an L-wheel formed of corrugated paper rolled up so that the corrugations form axial passages through the wheel. A wheel of such construction can more effectively dry the ambient air without degradation by combustion products or desiccant weeping to a much lower level of humidity than prior art desiccant systems. Also, based on the vapor pressure and kinetic data and the energy required to regenerate the L-wheel, a system according to our invention would be significantly improved over the prior art and result in a higher coefficient of performance for the system, an increased depth of drying, and a reduction in wheel size. The system is particularly applicable to drying, for example, humid air having a 92°F. dry bulb temperature and an 80°F. wet bulb temperature to a moisture content of less than .003 lb. $H_2O$/lb air.

9 Claims, 1 Drawing Figure

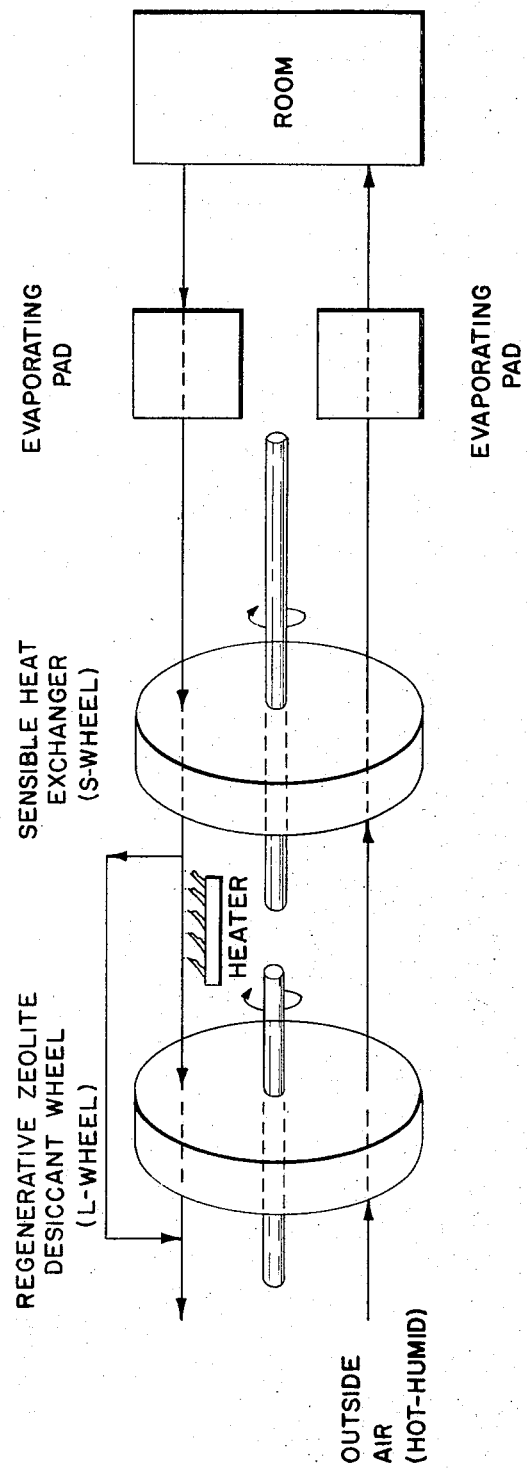

DESICCANT SYSTEM FOR AN OPEN CYCLE AIR-CONDITIONING SYSTEM

CROSS REFERENCE TO RELATED APPLICATION

This application is a continuation in part of our co-pending application, Ser. No. 24,373 filed Mar. 31, 1970, now abandoned, the teachings of which are incorporated by reference herein.

FIELD OF THE INVENTION

This invention relates in general to desiccant systems, and particularly to improved processes and apparatus for an open-cycle air-conditioning unit involving improved efficiency of cooling.

BACKGROUND OF THE INVENTION

Open-cycle air-conditioners are well known in the art. One system, known as the Munters environmental control system (MEC) unit, is described in U.S. Pat. No. 2,926,502. Basically, open-cycle air-conditioners operate by dehumidification and subsequent cooling of air wherein moist air is conditioned by a three-stage process to produce cool, relatively dry air.

Open-cycle air-conditioning systems comprise essentially four sections, considered in order from the interior room in which the air is to be conditioned, toward the exterior: (1) an adiabatic evaporating section designated an E-pad, (2) an S-wheel section, for transfer of sensible heat to and from air, (3) a heating section, and (4) an L-wheel section for transfer of latent heat of condensation and evaporation.

MEC units are fuel gas or electrically-operated environmental control systems which provide cooling in the summer, heating in the winter, year-around control of humidity, and effective removal of dust and pollen.

The principle involved in the cooling effect of the system is that dry, warm air can be simultaneously cooled and humidified by contacting it with water. In geographic areas where the air is both warm and humid, it must be dried before it can be cooled by evaporation. During the heating season of autumn, winter, and spring, the unit can be used to warm and humidify cold, dry air by making minor changes in the unit's operating cycle.

The efficiency and effectiveness of an open-cycle air-conditioning system depends largely on the ability of the unit to dehumidify the warm, moist input air. Although various means of dehumidification have been employed with open-cycle air-conditioners, none has provided the high, effective dehumidification necessary for efficient operation on air of exceptionally high temperature and humidity, while at the same time providing adequate kinetics and rapid regeneration leading to a high coefficient of performance.

A typical prior art type of L-wheel construction is shown in the U.S. Pat. to Pennington No. 2,700,537. There, the L-wheel is shown typically as a rotatable cylindrical means made of asbestos paper or other absorbent fire-resistant material which is impregnated with a liquid hygroscopic substance capable of sorbtion of moisture from air passing thereover. Moisture in the incoming air is sorbed by the hygroscopic material impregnated in the L-wheel, with the latent heat of condensation being taken up by the air, thus resulting in an air temperature increase. The incoming air therefore is heated and dehumidified by the L-wheel, and the resultant heated and relatively dry air is then passed through a rotating S-wheel which is relatively cool and which functions to cool the air with no change in moisture content. There the incoming air is humidified while the latent heat of vaporization is simultaneously extracted, thereby cooling the air. The resulting air is passed into the room at a lower dry bulb temperature than the outside air with about 95 percent relative humidity.

Conventional desiccants used with L-wheels are salts, such as lithium chloride used as the drying agent impregnated into the wheel material. However, LiCl does not have a deep drying capability for water adsorbing capacity required in humid climates. Although lithium bromide has been tried in such cases to improve the capacity of the conventional equipment, it tends to decompose and release small amounts of bromide to the air, a disadvantage so serious that no practical LiBr impregnated wheels are in use.

Even more serious a disadvantage is the fact that prior art desiccants "weep." That is, under conditions of high percentage of moisture in the incoming air, such as moist air having a dry bulb temperature of 92°F. and a wet bulb temperature of 80°F., the salts have a tendency to deliquesce and form aqueous solutions that drip from the wheel. These solutions then either flow out of the unit or are stripped by the flowing air. This condition thus leaches the wheel of its absorbent material rendering it useless. In addition, the aqueous solution tends to ruin the integrity of form of the wheel, causing channel collapse or plugging. In order to overcome this "weeping" problem, a very low practical limit in the amount of salt desiccant impregnated into the wheel is used. For example, this is on the order of a maximum of 11–12 percent for LiCl and up to 25–27 percent for LiBr. As a result of this low amount of desiccant, the L-wheels of the prior art must be very large with a high surface area to have any appreciable capacity. For example, a low desiccant/support ratio, on the order of 0.1 for LiCl, necessitates uneconomically large wheels having great masses of asbestos for the desiccant support, which in turn imposes substantial power requirements for rotation, and heat requirements for regeneration. High LiCl concentrations as indicated eventually lead to desiccant deliquesence. For example, a wheel could be made with a high (over 12 percent LiCl content) that would initially dry the mentioned moist air to a low level of say 0.003 lbs. $H_2O$/lb. of air. However, the LiCl would soon weep and the wheel could no longer dry the air to this level. Further, a wheel with less than 12 percent—i.e., 10 percent LiCl will not weep but cannot economically dry air in an open-cycle air-conditioner to a moisture level of 0.003 lb. $H_2O$/lb. air.

Another serious disadvantage of the prior art desiccants is the fact that their effectiveness of operation is temperature dependent. At lower temperatures the equilibrium vapor pressure for a given loading, in terms of lbs. $H_2O$/lb. desiccant, will be lower than at elevated temperatures. Thus, as the temperature rises the desiccant exhibits increasing equilibrium water vapor pressure. Since the air passing next to the desiccant cannot lose more water than this vapor pressure, the air is less deeply dried. This is termed high temperature loss.

This problem is aggravated by the fact that the desiccants are regenerated to a dry state by high temperatures in the regenerative half of the cycle, but the high temperatures carry over to the cooling half of the cycle by virtue of the heat capacity of the support and desiccant, thus causing high temperature loss.

In addition, prior art systems suffer from the disadvantage that the amount of heat energy required to regenerate the L-wheel adsorbent material is high, so that they have a poor coefficient of performance (COP) for the system.

Another problem with prior art systems using LiCl and LiBr desiccants is that the desiccant is chemically unstable and will deteriorate in the presence of products of combustion. Since the desiccants are used in an open-cycle air-conditioning system which typically includes drying the wheel with air heated by mixing the combustion products of natural gas, this is a very serious problem. For example, in the case of a LiCl wheel, the LiCl caN react with $SO_x(SO_2, SO_3)$ and $NO_x(NO_2, N_2O_3)$ present in a direct heated air stream to form salts such as $Li_2SO_4$, $LiNO_3$, both of which do not function as a desiccant material.

Finally, prior art desiccant materials suffer from the fact that they have very poor "kinetics." By the term kinetics, it is meant that during the continuous rotation, the wheel must perform the functions of absorbing water from the incoming moist air on the input half of the cycle and then be regenerated to the dry state on the output half of the cycle. This is conventionally done by heating the exhaust air to a very high temperature, resulting in a relatively low humidity. The very hot, relatively dry air in passing through the L-wheel on the exhaust portion of the cycle withdraws water from the moistened L-wheel material. However, the fact that the wheel is continuously in motion means that there is only a short residence time in the regenerative half of the cycle, and thus the impregnated moisture-accepting material of the L-wheel may not be sufficiently dried to function efficiently on the second and subsequent input half of the cycle.

THE INVENTION

Objects

It is an object to provide an improved desiccant system for air drying, particularly useful in open-cycle air-conditioning systems.

It is another object of the present invention to provide an improved method of operation of an open-cycle air-conditioning system.

It is another object to provide a substantially better desiccant system that does not weep at high humidity levels, and which is characterized by high desiccant-/support ratios of up to about .9.

It is another object to provide a desiccant system for an open-cycle air-conditioning system and method of operation that can effectively dry the ambient air much more deeply than the prior art desiccant systems.

It is another object of this invention to provide a method of operation of an open-cycle air-conditioning system characterized by handling of smaller amounts of total air to satisfy the air-conditioning load, resulting in smaller air moving equipment, lower power requirements to move the air, smaller overall machine size, and smaller L and S-wheel size as compared to prior art devices.

It is another object to provide an L-wheel which is at least about a four-fold reduction in size as compared to L-wheels of the prior art.

It is another object of this invention to provide an open-cycle air-conditioning system utilizing lower energy to regenerate the L-wheel, resulting in a higher coefficient of performance for the system and an increased depth of drying as compared to prior art systems.

It is another object of this invention to provide an open-cycle air-conditioning system that is not sensitive to the products of combustion including, for example, $NO_x$ and $SO_x$.

It is still another object of this invention to provide a desiccant system that has a greater thermal and chemical stability than systems of the prior art.

It is still a further object of this invention to provide a method of open-cycle air-conditioning having improved kinetics and energy parameters as compared to the prior art.

Still other and further objects of this invention will be evident from the description which follows.

Preferred embodiments of the invention are shown in the FIGURE wherein:

The FIGURE shows a diagramatic view of one embodiment of the apparatus of this invention.

SUMMARY OF THE INVENTION

The system of this invention involves the use, in any type of open-cycle air-conditioning device, of an improved L-wheel in which the desiccant system comprises the use of thin sheets or layers of a fibrous material having impregnated therein from about 1 to 90 percent by weight of a solid desiccant comprising finely powdered, solid, crystalline alkali metal or alkaline earth metal alumino-silicates that have the water of hydration removed. The desiccant materials particularly useful are crystalline, natural or synthetic zeolites or molecular sieves, and these terms are used interchangeably throughout.

Typical of the fibrous material which may be used is cellulose paper, particularly for fairly low temperature operation at temperatures below about 250°F. Other "papers" which may be used at higher temperatures include papers manufactured of the following types of fibers: asbestos, fiberglass, "Teflon," "Kel-F," polyamides such as Nylon, polyesters such as Dacron, and mixtures of these fibers. In general, any type of material may be used which can be first formed into fibers, and thereafter by standard paper making processes into a mat of material containing therein and thereon the molecular sieve adsorbent material. This includes not only natural fibers such as cellulose or asbestos materials but also synthetics including plastics such as those mentioned above and other fiber-forming high molecular weight polymer materials. Generically, the Teflon and Kel-F materials are, respectively, polytetrafluoroethylene and poly-chlorotrifluoroethylene polymers. Some types of Kel-F polymers are also copolymers of vinylidene fluoride with chlorotrifluoroethylene.

The papers thus formed containing the solid desiccant impregnated during conventional paper-manufacturing processes are then formed into moisture or heat transfer bodies, such as L-wheels, in a manner conventional to the art. Generally speaking, zeolites or molecular sieves are well understood to be a type of alkali metal or alkaline earth metal alumino-silicate, and we can use any synthetic or natural type material in the process of our invention. Typically useful are the commercially available molecular sieve materials, such as those designated as types A-3, A-4, A-5, and 13-X. The desiccant powders are readily incorporated into the paper during the manufacture thereof by forming a slurry of the paper fibers and the powder in water and depositing the slurry on a screen, which in continuous processes is moving, followed by the conventional steps of water removal transfer of the paper to drying means, and collecting the paper in rolls or other convenient forms. Thereafter, the paper can be processed in a form useful for construction of the L-wheel, as, for example, the formation of a corrugated paper having a thickness and a periodicity within the range of from about 1/16 to ½ inch. A suitable size is a thickness of 1/16 and periodicity of ⅛ inch. Thereafter, the corrugated paper is cut into strips and wrapped around the axle of the L-wheel in a spiral fashion to the desired L-wheel diameter. Alternatively the desiccant-bearing support material may be shaped in a honeycomb form or expanded into shape. By the term expanded, we mean the formation of regular or irregular honeycomb shapes by strip-gluing together layers of the desiccant-bearing paper, in alternating positions for successive layers, followed by lateral opening or expanding the laminate to form the honeycomb apertures between adjacent sheets. The expanded form permits a reduction in the pressure drop in the system, simplification of manufacture and reduction in cost.

A better understanding of the nature of the invention is had by reference to the following detailed description.

DETAILED DESCRIPTION

The air-conditioning system of our invention comprises essentially four setions: an evaporating section including E-pads, a heat transfer wheel for transfer of sensible heat to and from air (the so-called S-wheel), a moisture transfer wheel for transfer of latent heat of condensation (the so-called L-wheel) and the heating section disposed between the S- and L-wheels on the exhaust side of the system. The improvement in this system according to the present invention lies in the provision of an improved L-wheel which permits improved operation of the entire system in combination therewith. In the evaporation section, water is supplied to evaporator pads, fins or other suitable mass transfer means for contacting the air passing therethrough. The S-wheel is a water-impervious rotatable cylindrical means for transferring sensible heat to or from the air flowing therethrough. The heating section is typically a gas-fired burner for heating the air passing therethrough to a very high temperature, ordinarily on the order of about 325°F., but may be as high as 500°F. in our system.

In the normal operation of the open-cycle air-conditioning system, outside air is introduced into a segment or portion of the rotating L-wheel by a fan. Moisture in the air is sorbed by the desiccant material impregnated in the L-wheel support material fibers with the latent heat of condensation being taken up by the air, thus resulting in an air temperature increase. The incoming air, therefore, is heated and dehumidified in the L-wheel. The resultant heated and relatively dry air leaving the L-wheel on the input half of the cycle is passed through a segmented portion of the rotating, water-impervious S-wheel which is relatively cool. The air is thereby cooled down with no change in moisture content. From the S-wheel, the relatively cool, relatively dry air passes over the evaporator pads of the evaporator section. The water is thereby evaporated and the air is humidified. Simultaneously the latent heat of vaporization is extracted from the air thereby cooling it so that the resulting air is passed into the room in which the air is being conditioned. The air entering the room from the outside thus has a lower dry bulb temperature than the outside air with about 95 percent relative humidity.

Briefly, the regenerative half of the cycle according to our system is as follows: air from the room is passed over the exit side of the evaporator section. While passing over the evaporator pads therein, the air is cooled while water is evaporated from the air. The resultant cool, relatively moist air is then passed over a segmented portion of the S-wheel which is rotated into position and which is cooled thereby. All or part of the moist, heated air from the S-wheel then passes through the burner section where its temperature is greatly increased and the relative humidity is decreased. The heated air from the burner section is then passed over the wet portion of the L-wheel which has rotated into position. Because of the low relative humidity of the exhausting air, the L-wheel is dried by the hot gases and water extracted from the adsorbent thus regenerating the wheel for renewed operation in the input half of the next cycle. The hot gases after passing through the L-wheel are rejected to the outside thus completing the cycle. When utilizing a zeolite-containing wheel according to this invention, increased depth of drying is obtained which further produces improved results in comparison to a LiCl wheel.

Typical outdoor conditions in which the open-cycle systems of this invention may operate include a wet bulb temperature greater than 75°F. and a dry bulb temperature greater than 80°F. such as air with a 92°F. dry bulb temperature and an 80°F. wet bulb temperature as found in the outdoor conditions of Miami, Florida. Produced is air with a moisture content of less than 0.003 lbs. $H_2O$/lb air. The open-cycle system of this invention is particularly suitable for air having a dry bulb temperature in the range of 80°F.–120°F. and a wet bulb temperature in the range of 75°F.–90°F. wherein the air has an absolute humidity level of about 0.017 to about 0.022 lbs $H_2O$/lb air. In contrast, conventional LiCl open-cycle air-conditioning systems cannot economically produce dried air close to the 0.003 lbs $H_2O$/lb air value when operating with humid air in this range. According to the system of the present invention, indoor conditions achievable are 76°F. with only a 50 percent relative humidity. As compared to the use of a lithium chloride-asbestos wheel combination, we have found that the system according to our invention shows improved performances of on the order of 10–15 percent. In addition, the molecular sieves on L-wheels are not sensitive to products of combustion such as $NO_x$ and $SO_x$ commonly found in the hot gases. In contrast, LiCl reacts with $NO_x$ and $SO_x$ to render the desiccant inactive for air drying.

The desiccants used in this invention may include natural crystalline zeolites, such as stilbite, or synthetically produced crystalline metal alumino-silicates known as molecular sieves, activated for adsorption by removing their water of hydration. Molecular sieves belong to the class of compounds known as zeolites, but this latter term is also inclusive of both gel-type amorphous alumino-silicates commonly referred to as zeolites (used as water softeners), and of the crystalline zeolites used in this invention. The amorphous type do not exhibit selectivity based on molecular size.

The unit cell of the crystalline zeolites of this invention have a unit cell formula of $M_{2/n}O \cdot Al_2O_3 \cdot xSiO_2 \cdot yH_2O$ where M is a cation of $n$ valence. The fundamental group in each unit cell, the smallest repetitive entity in the crystalline material, is a tetrahedra of four oxygen anions surrounding a silicon or alumina cation with the metal cation making up the positive charge deficit in each alumina tetrahedra. Among the over 40 commercial zeolites available, we prefer the 3-A, 4-A, 5-A, 10-X, and 13-X types. The 4-A type has a unit cell formula of $Na_{12}[(AlO_2)_{12}(SiO_2)_{12}] \cdot 27 H_2O$, in which two alumina and two silica tetrahedra link to form a rigid compact group. The latter links with other identical groups to form a cubic cell having a ring aperture on each face, the diameter of this aperture being 4 A, hence the designation 4-A. The central adsorption cavity of the cube has a volume of about 925 $A^3$, which is occupied by the water of hydration which can be driven off by heat. The water enters and leaves through the aperture. About $10^9$ unit cells comprise a cubic crystal in the powder form which measures about 1 $\mu$ along an edge, but which may be as large as $2\mu$, and can agglomerate with others to form a particle of size about $10\mu$ in size. Some penetration twinning type crystals range up to 30–40$\mu$ in size.

Of the 12 $Na$ cations in type 4-A, six are located at the pore openings partially blocking them and the remainder are located on the interior of the cube. Any or all of these Na cations can be exchanged with other metal cations, for example by potassium to give an aperture of 3 A, hence the designation of 3-A for this type. Type 5-A is formed by exchanging the 12 $Na$ cations with an equivalent of calcium cations, six in number, which locate on the inner face of each cell leaving the apertures unrestricted, of size 4.2 A. Type 13-X has the unit cell formula $na_{86}[AlO_2)_{86}(SiO_2)106] \cdot 276 H_2O$, while the 10-X type has an effective ring diameter of about 8 A. All these types have bulk density of about 30 lbs./cu.ft. for powders in the 1–10$\mu$ size range.

The A type molecular sieve, as well as having a central cavity termed the cage, also has a second set of cavities or B cages formed by the truncated octahedra unit cells joined in cubic array which, although smaller can accept water molecules in the hydration-dehydration cycle of our invention.

By way of example, an asbestos fiber paper was prepared by forming a slurry of the asbestos fiber with a molecular sieve, type 4-A, which is a finely powdered sodium alumino-silicate of unit crystalline cell of empirical formula $Na_{12}(AlO_2)_{12}(SiO_2)_{12} \cdot 27 H_2O$ (hydrated form) of size 1–10$\mu$. For test purposes, a sheet was formed containing 25 percent by weight of the molecular sieve impregnated into and on the asbestos fiber. At test conditions of average temperature of 194°F. (90°C.), with regeneration at the same temperature, and air moisture content of 0.019 lb. $H_2O$/lb. air, one lb. of the desiccant-bearing asbestos system of this invention can remove 0.083 lbs. $H_2O$ per pound of wheel to a dry air level of 0.0012 lb. $H_2O$/lb. air.

For comparison, a standard asbestos sheet of paper was prepared in the same manner without the molecular sieve material in the water-fiber slurry. Thereafter, the asbestos was impregnated with 12 percent by weight lithium chloride adsorbent. This amount of impregnation of lithium chloride is about the maximum permissible without having weeping. Under the same test conditions as above (194°F.) each pound of the LiCl-asbestos system can remove only 0.018 lb. of water per pound of wheel from ambient air having the same moisture content (0.019 lb. $H_2O$/lb. air) resulting in a dry air level of only about 0.003 lbs. $H_2O$/lb. air. Lower levels are not practical.

The comparison shows over a four-fold increase in the drying capacity (0.083/0.018) for only a little over a doubling of the desiccant/support ratio for the system according to this invention. In addition, the high desiccant/support fractions of up to about 0.9 as compared to 0.1 for LiCl is a significant improvement.

The vapor pressure of the two L-wheel materials, asbestos having impregnated therein 45 percent molecular sieve material according to the present invention, and asbestos having impregnated therein 11 percent lithium chloride according to the prior art, were tested at 90°C. with the results shown in Table 1.

Table 1 below shows that the molecular sieve bearing paper of this invention absorbs more water per lb. of total system seen by the increased loading capable with molecular sieves compared to LiCl for a given vapor pressure. Conversely, at a given loading value the equilibrium vapor pressure above the molecular sieve material of this invention is lower than with LiCl, thus resulting in deeper drying.

TABLE 1

Vapor Pressure-Loading Characteristics of
L-Wheel Desiccants Supported on Asbestos

| LiCl on Asbestos at 90°C. | | Crystalline Zeolite on Asbestos at 90°C. | |
|---|---|---|---|
| lbs.$H_2O$/lb. system | Equilibrium Vapor Pressure mm Hg | lbs. $H_2O$/lb. system | Equilibrium Vapor Pressure mm Hg |
| .005 | 56 | .005 | 5 |
| .01 | 118 | .01 | 15 |
| .015 | 175 | .015 | 31 |
| .02 | 234 | .02 | 57 |
| .025 | 282 | .025 | 88 |
| .03 | 350 | .03 | 125 |

In addition, the amount of molecular sieve which can be incorporated into the fibrous material according to this invention is substantially greater than the lithium chloride or lithium bromide of the prior art. Whereas a maximum concentration for lithium chloride is on the order of 11 or 12 percent, and up to 27 percent by weight may be obtainable for a lithium bromide material, we have found that the molecular sieves of our invention may be incorporated in an amount of from about 1 to 90 percent, preferably 25 to 45 percent. We have found extremely good properties with an amount of molecular sieve on the order of 25 percent impregnated into the fibrous material.

A typical L-wheel according to this invention would be constructed of a corrugated fiberglass paper having incorporated therein from 25 to 45 percent of molecular sieve, preferably a 3-A, 4-A, 5-A or 13-X type, the corrugations having a thickness on the order of ⅛ inch and a periodicity of on the order of 3/16 inch, with the wheel having a total diameter of on the order of 12 inches. The wheel rotates at a speed of from three to four minutes per revolution with the air velocity on the order of 200 feet per minute/passing therethrough at a temperature on the inside of the L-wheel, that side adjacent to the heating section, on the order of 325°F.–500°F. The depth or thickness of the wheel is somewhat dependent upon the climatic region and in a middle western region would have a depth on the order of 6 inches. For more moist climates, the thickness of the wheel can be increased whereas for less moist climates the thickness would be decreased. In contrast, an L-wheel employing the practical maximum of 11 percent by weight LiCl would have the following parameters of operation for equivalent capacity: Diameter 24 inches, thickness 6 inches, rotation speed 3–4 minutes per revolution, at the same air flow and corrugation size above.

While the overall level of performance of the L-wheel also depends upon the climatic region of use, the performance of prior art systems typically deliver dried air on the input side of the L-wheel with an absolute humidity of 0.003 lb. water per lb. of air passing therethrough. For this level of humidity, a lithium chloride-asbestos wheel at reference conditions will require 0.99 air, have a relative energy value of 1.03, and will handle a dried air amount of 0.75. In contrast, the molecular sieves according to the present invention at the above regeneration of 500°F. will deliver dried air on the input side with a humidity of 0.0012 lb. of water per lb. of air, with a required air level on the order of only 0.79, and energy value of 0.92, and will handle 0.64 dried air. It can be seen that the air is dried to a greater depth, the improvement being on the order of 2 ½ times dryer, while at the same time lesser air is required at an energy savings on the order of over 10 percent. This leads to a major gain insofar as smaller machines may be constructed due to the capability of deeper drying.

In addition, we have found that we can regenerate at substantially higher temperatures in the presence of products of combustion without degradation or deterioration of drying ability when using the molecular sieve of the present invention. Whereas at low temperatures of regeneration, below about 250°F., a kraft paper support may be used, at higher temperatures we prefer to use the asbestos, fiberglass or high-temperature resistant polymeric material such as Teflon or Kel-F. The higher regeneration temperature also provides us with improved regeneration time and a reduction in total energy required. In addition, these materials permit a regeneration on the order of 500°F. which in turn provide for more nearly total reactivation of the molecular sieves thus leading to improvements in drying ability.

While we have described our invention in connection with specific embodiments thereof, it is to be understood that this is by way of illustration and not way of limitation, and the scope of our invention is defined solely by the appended claims which should be construed as broadly as prior art will permit.

We claim as our invention:

1. In a method for conditioning air including the steps of:
    a. passing outside air through a first portion of a rotating dehydrating L-wheel to produce relatively dry air;
    b. passing said relatively dry air through a first portion of a rotating sensible heat exchanging S-wheel to produce relatively cool dry air, for use in an enclosed conditioned space;
    c. withdrawing a stream of exhaust air from said conditioned space through an evaporative pad;
    d. passing said exhaust air stream through a second portion of said S-wheel whereby said S-wheel is cooled;
    e. passing a portion of said exhaust air through a heating section;
    f. passing said heated exhaust air through a second portion of said L-wheel to be exhausted to the outdoors; the improvements in said steps passing outside air and exhaust air through respective portions of the L-wheel comprising:
    1. continuously contacting said outside air passing through said L-wheel with a desiccant material contained in said L-wheel, which desiccant material consists essentially of a finely powdered crystalline zeolite material, for a time sufficient to permit said zeolite material to sorb water vapor from said air to a water vapor content of less than about 0.003 lbs. $H_2O$/lb. air, said air having a dry bulb temperature of about 80°F. to 120°F., a wet bulb temperature of about 75°F. to 90°F., and an absolute humidity level of about 0.017 to about 0.022 lbs. $H_2O$/lb. air,
    2. continuously regenerating said zeolite in said L-wheel by heating said zeolite with said heated exhaust air for a time sufficient to return said zeolite to substantially its original water vapor sorption capacity,
    3. maintaining said sorption step 1 at a temperature below said regeneration step 2, and
    4. maintaining said steps of sorption and regeneration in a repetitive sequence, whereby said process shows the improved properties of non-deterioration in the presence of products of combustion, lack of desiccant weepage, a higher coefficient of performance, lower power requirements, smaller L-wheel size, smaller air moving equipment, and greater thermal and chemical stability.

2. A method as in claim 1 wherein said L-wheel comprises a paper impregnated with said crystalline zeolite material.

3. A process as in claim 2 wherein said crystalline zeolite desiccant material is impregnated into paper during the manufacture of said paper in an amount ranging from about 25 to 90 percent by weight of the finished paper material in a dry condition.

4. A process as in claim 3 wherein said paper material comprises fibers selected from the group consisting of cellulosic fibers, asbestos fibers, glass fibers, synthetic plastic fibers, and mixtures thereof.

5. A process as in claim 4 wherein said synthetic plastic fibers are selected from the group consisting of nylon fibers, polyester fibers, poly-tetrafluoroethylene fibers, poly-chlorotrifluoroethylene fibers, copolymers of tetrafluoroethylene or chlorotrifluoroethylene with vinylidene fluoride, and mixtures of said fibers.

6. A process as in claim 5 wherein said L-wheel material comprises glass fibers containing from 25 to 45 percent of said crystalline zeolite material.

7. In an open-cycle air-conditioning apparatus including a heat removal means, a rotatable moisture transfer wheel, an evaporator, heating means disposed between said heat removal means and moisture transfer wheel, and means for recirculating air through said heat removal means and moisture transfer wheel on an input flow path and an exhaust flow path, the improvement in said moisture transfer wheel comprising an apertured support material containing a finely powdered crystalline zeolite desiccant in an amount ranging from about 25 to 90 percent by weight on a dry basis, said support material being selected from the group consisting of cellulosics, glass fibers, asbestos fibers, synthetic plastic fibers, and mixtures thereof.

8. An apparatus as in claim 7 wherein said synthetic plastic fibers are selected from polyamides, polyesters, poly-tetrafluoroethylene, poly-chlorotrifluoroethylene, and copolymers of vinylidene fluoride with tetrafluoroethylene and chlorotrifluoroethylene, and mixtures thereof.

9. An apparatus as in claim 7 wherein said improved moisture transferring wheel comprises fiberglass paper formed with axial aperture therein and containing from 25 to 45 percent by weight of a said crystalline zeolite material on a dry basis.

* * * * *